United States Patent [19]
Schroter et al.

[11] Patent Number: 5,345,001
[45] Date of Patent: Sep. 6, 1994

[54] AQUEOUS RESOL SOLUTIONS AND PREPARATION THEREOF

[75] Inventors: Stephan Schroter, Iserlohn-Letmathe; Achim Hansen, Iserlohn; Arno Gardziella, Witten; Peter Adolphs, Menden-Hallingen, all of Fed. Rep. of Germany

[73] Assignee: Rutgerswerke Aktiengesellschaft AG, Fed. Rep. of Germany

[21] Appl. No.: 110,574

[22] Filed: Aug. 23, 1993

[30] Foreign Application Priority Data

Sep. 17, 1992 [DE] Fed. Rep. of Germany ....... 4231039

[51] Int. Cl.$^5$ .................. C07C 39/12; C07C 37/20
[52] U.S. Cl. ................... 568/727; 568/719; 568/720; 568/721; 568/722
[58] Field of Search ............. 568/722, 727, 763, 720, 568/721, 719

[56] References Cited

U.S. PATENT DOCUMENTS

| | | | |
|---|---|---|---|
| 3,027,412 | 3/1962 | Hotelling et al. | 568/727 |
| 3,425,989 | 2/1969 | Shepard et al. | 568/727 |
| 5,220,079 | 5/1993 | Iwane et al. | 568/727 |

FOREIGN PATENT DOCUMENTS

| | | | |
|---|---|---|---|
| 4130120 | 5/1992 | Japan | 568/720 |

*Primary Examiner*—Werren B. Lone
*Attorney, Agent, or Firm*—Bierman and Muserlian

[57] ABSTRACT

An aqueous resol solution produced by an alkaline condensation of a phenolic compound with an aldehyde in a molar ratio of 1:1.5 to 2.5 with an alkali metal content of 1 to 5.0% by weight of the reaction solution, neutralizing the solution after the end of condensation at least partially with an aromatic hydroxy carboxylic acid at a temperature not greater than 50° C. and then concentrating the reaction mixture which is readily dilutable with water.

12 Claims, No Drawings

AQUEOUS RESOL SOLUTIONS AND PREPARATION THEREOF

Dry aqueous resol solutions with low phenol content which can readily be diluted with water are frequently required as reins for lacquers and varnishes or as binding resins for abradants on substrates, wherein the resin manufacturer produces a solution with a maximum solid content which is diluted to the application concentration at the time of use by simply mixing with water. To make this possible, high requirements must be made of the stability of the solution, i.e. during the storage and transport of the resin solution, no precipitation must occur of any of the salts, polymers or addition compounds.

Resols result from condensation of phenolic compounds with aldehydes, particularly formaldehyde, in a strongly alkaline medium. After completion of the condensation reaction, the reaction mixture is largely neutralized with an acid, such as dilute HCl (cf. Ullmanns Enzyklopadie der technischen Chemie, 4th edition, Volume 8, page 251). Water and excess phenol are then largely distilled off whereby highly concentrated aqueous solutions are obtained.

To fulfill the increased requirements with respect to low phenol content, instead of the conventionally used molar ratios of the phenolic compounds to aldehyde of 1:1 to 1.5, phenol-aldehyde ratios of 1:1.5 to 1:2.5 must be used. Furthermore, to obtain aqueous coating systems suitable for highly condensed low-monomer resols, the amount of alkali conventionally used in the condensation reaction of approximately 1.0%, relative to the reaction mixture, must be increased to approximately 3.5% by weight.

This leads to the precipitation of salts when the reaction mixture is neutralized and the resol solutions are concentrated which leads to disturbances and, particularly when diluting the concentrates, to undesirable inhomogenities of the diluted solutions. Moreover, under these condensation conditions, resols are formed with an increased fraction of methylol groups which lower the performance of the cured resin through excessive brittleness. The capabilities of being water resistant and of grain inclusion are also significantly impaired. Furthermore, monomer-containing emissions develop during the curing which require safety protection during working and waste gas purification.

OBJECTS OF THE INVENTION

It is an object of the invention to provide homogenous stable resol solutions with low phenol content and a high resin content free of salt precipitation.

It is another object of the invention to provide a resol resin easily dilutable with water over wide limits, which release fewer harmful emissions during curing and have good grain inclusion and water resistance capability after curing.

These and other objects and advantages of the invention will become obvious from the following detailed description.

THE INVENTION

The novel aqueous resol solutions of the invention are produced by an alkaline condensation of a phenolic compound with an aldehyde in a molar ratio of 1:1.5 to 2.5 with an alkali metal content of 1 to 5.0% by weight of the reaction solution, neutralizing the solution after the end of condensation at least partially with an aromatic hydroxy carboxylic acid at a temperature not greater than 50° C. and then concentrating the reaction mixture.

It has been found that high quality aqueous phenol resol solutions with a content of free phenol of less than 1% can be produced if in the production the following conditions are met:

- the molar ratio of phenolic compounds to aldehyde is in the range of 1:1.5 to 2.5.
- The alkali content of the reaction solution during the condensation reaction is in the range of 1.0 to 5 percent by weight, preferably in the range of 1.5 to 3.5 percent by weight.
- After the completed condensation, the neutralization of the reaction solution is carried out at least partially with an aromatic hydroxy carboxylic acid.
- During the neutralization, a temperature of the reaction mixture of 50° C. is not exceeded.

In the resol solutions produced in this way, no precipitation of salts occurs even after the solution has been strongly concentrated. Consequently, homogeneous stable resol solutions are obtained with a resin content of up to 85%. The solutions can be diluted to any given degree by simply mixing them with water. A further advantage of the resol solutions produced by the invention resides in that their storability with respect to the reactivity of the resins is significantly improved so that even relatively long transport and storage times are possible without resulting in deterioration of the quality of the resin.

During the curing of the resins, the emissions of monomer substances are greatly reduced so that in general, the waste gas purification expenditures can be markedly minimized.

After drying the resol solution and thermally curing the resol, a binding agent with high water resistance and good grain inclusion (in abradants) is obtained which is suitable as a resin in lacquers and varnishes, but particularly as a bonding resin for abradants on substrates. Consequently, through the resol solutions of the invention, high quality binding means for abradant means on substrates are made available which have largely monomer-free waste gas emissions during the curing.

The condensation reaction is carried out in a manner known per se by heating the condensation partners for several hours in an aqueous alkaline solution. As condensation partners, all phenolic compounds and aldehydes known in the production of phenol resins can be used. A preferred phenolic compound is phenol but also aliphatic or aromatic substituted phenols as well as multivalent phenols can be used. Examples are cresols, xylenols, tertiary octylphenol, naphthols, p-phenylphenol, bisphenols or resorcinol, as well as natural substances such as for example cardenol or cardol. The phenolic compounds can be used as single compounds or in any desired mixture.

As aldehydes, there can be used all compounds having the general formula R-CHO. Examples are formaldehyde, acetaldehyde, propylaldehyde, n-butylaldehyde or isobutylaldehyde, glyoxal or furfural. The preferred aldehyde is formaldehyde such as paraformaldehyde or trioxane. The form in which it is preferably added is an aqueous solution with a formaldehyde content of more than 30% (formalin). The molar ratio of the phenolic compound to aldehyde can be chosen within the range of 1:1.5 to 1:2.5.

The alkalinity of the condensation mixture is achieved through the addition of alkaline solution, preferably sodium hydroxide solution, wherein the amount of alkali metal is selected to be in the range of 1.0 to 5 percent by weight, preferably in the range of 1.5 to 3.5 percent by weight relative to the total condensation mixture.

After the condensation reaction is completed, the condensation mixture can be neutralized directly. In view of an often desired low aldehyde content of the resin, the condensation mixture is frequently subjected to a subsequent treatment with urea. To this end, urea is added to the warm condensation mixture in an amount of up to 10 percent by weight relative to the solid resin and this reaction mixture is again kept at 50 to 60° C. for 0.5 to 2 hours. From time to time after the reaction or after the addition of urea, excess water is distilled from the reaction mixture by vacuum distillation at 50 to 60° C. In these cases, no special thermal treatment is necessary of the reaction mixture with the urea.

The reaction mixture freed in this way of excess aldehyde, particularly formaldehyde, is neutralized after cooling or under continuous cooling up to a pH value of 6.5 to 8.0, wherein 50 to 100 percent of the quantity of alkali metal to be neutralized is neutralized with an aromatic hydroxy carboxylic acid. Up to 50 percent of the quantity of alkali metal to be neutralized can be neutralized with another acid known from prior art whose alkali metal salts are readily water-soluble. It is critical for the quality of the resulting, nearly neutralized resol that the temperature of the reaction mixture does not exceed 50° C. during the neutralization.

In addition, it was found to be useful in achieving a homogeneous distribution to carry out the neutralization stepwise, for example to neutralize the solution after condensation, first partially under cooling to a pH value in the range of 11 to 12 and, after a phase in which it allowed to stand for 10 to 30 minutes, to carry out the final neutralization to a pH of 6.5 to 8.0. Examples of usable aromatic hydroxy carboxylic acids are o-, m- and p-hydroxy benzoic acid or gallic acid. The preferred acid is salicylic acid.

In the following examples, there are described several preferred embodiments to illustrate the invention. However, it is to be understood that the invention is not intended to be limited to the specific embodiments.

EXAMPLE 1

522 of phenol and 41.8 g of 50% sodium hydroxide solution were introduced into a reaction vessel provided with a stirrer and heated to 75° C. Over a period of 2 hours, 814 g of 45% formalin (molar ratio phenol:formaldehyde=1:2.2) were added and the temperature was held at 75° C. for approximately 6 hours until a water dilutability of 10:60±1 was achieved. The preparation was cooled to 45° C. and mixed with 52 g of salicylic acid while stirring and cooling. The temperature of the reaction mixture was always below 50° C. and water dilutability of 10:20 ±3 was obtained. The resin was distilled in vacuo to a viscosity of 3500 mPa.s at 20° C. After 30 days of storage at 20° C, the resin still had a viscosity at 20° C. of less than 10,000 mPa.s.

EXAMPLE 2

Into a reaction vessel provided with a stirrer were introduced 565 g of phenol and 67.8 g of 50% sodium hydroxide solution and heated to 60° C. Over a period of 2.5 hours, 962 g of 45% formalin (molar ratio phenol:formaldehyde=1:2.4) were added and the temperature of the reaction mixture was maintained at 60° C. until the content of free phenol was 0.7±0.1%. Then, 47.7 g of urea were added and the mixture was kept at 60° C. for one hour. The preparation was cooled to 45° C. and mixed with 89.4 g of salicylic acid with stirring and cooling. The temperature of the reaction mixture was always below 50° C. and water dilutability of 10:30±10 resulted. The resin was distilled in vacuo to a viscosity at 20° C. of 2100 mPa.s.

EXAMPLE 3 (comparison example)

Analogous to example 2, a phenol resin was produced, without carrying out a terminating partial neutralization with salicylic acid.

| Properties of the resins according to Examples 1 to 3: | | | |
| --- | --- | --- | --- |
|  | Example 1 | Example 2 | Example 3 |
| Non-volatile fractions at 135° C. | 78.9% | 74.8% | 71.0% |
| Viscosity at 20° C.* | 3500 mPa · s | 2100 mPa · s | 2200 mPa · s |
| Water dilutability (cloudy) | 10:20 | 10:41 | infinite |
| Gelling time at 100° C. | 44'20" | 43'30" | 20'10" |
| Gelling time at 130° C. | 8'51" | 8'45" | 7'00" |
| Content of free phenol | 0.8% | 0.5% | 0.6% |
| Content of free formaldehyde | 2.2% | 0.9% | 0.6% |
| Alkali number** | 16.3 | 18.8 | 64.1 |
| Alkali content | 0.65% | 0.75% | 2.56% |
| pH value at 20° C. | 8.58 | 8.6 | 9.4 |
| Water content | 14% | 20% | 23% |

*Drop ball viscometer
**ml HCl/100 g in titration to pH 5 in acetone/water mixture

| Viscosity at 20° C. after storage at 20° C. | | |
| --- | --- | --- |
| Time Days | Resin of Example 2 Viscosity at 20° C. [mPa · s] | Resin of Example 3 Viscosity at 20° C. [mPa · s] |
| 0 | 2100 | 2200 |
| 6 | 3040 | 2880 |
| 9 | 2960 | 3120 |
| 13 | 3440 | 3520 |
| 16 | 3480 | 3840 |
| 20 | 4120 | 4720 |
| 23 | 4200 | 4900 |
| 27 | 5280 | 5500 |
| 41 | 7360 | 11520 |
| 45 | 8800 | 17000 |
| 49 | 9280 | 21000 |
| 52 | 10880 | 25000 |
| 66 | 18560 | 40000 |
| 72 | 24960 | 70000 |
| 97 | 79360 | — |

EXAMPLE 4

According to the following method, abradants on substrates were produced with the resins of Examples 1 to 3 and the abrasive power was assessed in a practical test: The resins were mixed with filler substances (chalk) and water. By application with cylinders, the foundation lacquer was applied onto soda kraft paper and the abrasive grain (aluminum oxide abrasive, SiC) was then applied by the electrostatic dispersion process. After it was hardened at 100° C., the application of the covering lacquer or varnish took place to fix the grain.

The final curing took place at 100 to 140° C. and after the fixing process, the abrasive power was assessed.

Foundation lacquer:
Resins of Examples 1 to 3=55 parts by weight
Calcium carbonate=40 parts by weight
A viscosity of 3000 mPa.s (at 20° C.) was set with water
Application: 200 to 250 g/m²
Abrasive grain:
Grain 60:470 g/m²
Covering lacquer or varnish:
Recipe for foundation lacquer or varnish The abrasive means produced with the resins of Examples 1 and 2 (even after storage for several months) had an abrasive power which corresponded to that of the conventionally produced abrasive means on substrates. However, the emission charge during the curing as well as during the abrasive process was significantly reduced. The abrasive power of the abrasive means produced with the resin of Example 3 did not meet the requirements. In particular, after a storage of the abrasive means with the resin of Example 3 of approximately 14 days, the abrasive power decreased severely and the abrasive means were not usable.

Various modifications of the compositions and process of the invention may be made without departing from the spirit or scope thereof and it is to be understood that the invention is intended to be limited only as defined in the appended claims.

What is claimed is:

1. An aqueous resol solutions produced by an alkaline condensation of a phenolic compound with an aldehyde in a molar ratio of 1:1.5 to 2.5 with an alkali metal content of 1 to 5.0% by weight of the reaction solution, neutralizing the solution after the end of condensation at least partially with an aromatic hydroxy carboxylic acid at a temperature not greater than 50° C. and then concentrating the reaction mixture.

2. The process of claim 1 wherein phenol is condensed with formaldehyde.

3. The process of claim 1 wherein the aromatic hydroxy carboxylic acid is salicylic acid.

4. The process of claim 1 wherein the condensation product is modified with urea before neutralization.

5. A process for the preparation of an aqueous resol solution of claim 1 comprising condensing an aqueous mixture of a phenol with an aldehyde in a molar ratio of 1:1.5 to 2.5 in the presence of 1 to 5% by weight of an alkali metal, neutralizing the condensation product at least partially with an aromatic hydroxy carboxylic acid at a temperature not greater than 50° C. and concentrating the reaction mixture.

6. The process of claim 5 wherein phenol and formaldehyde are condensed.

7. The process of claim 5 wherein before neutralization urea is added to the condensation product which is held at 50° to 60° C. for 30 to 120 minutes.

8. The process of claim 5 wherein the aromatic hydroxy carboxylic acid is salicylic acid.

9. The process of claim 5 wherein 50 to 100% of the alkali metal is neutralized with the aromatic hydroxy carboxylic acid.

10. The process of claim 5 wherein the neutralization is effected stepwise.

11. A water-dilutable lacquer or varnish containing an aqueous resol solution of claim 1.

12. A bonding resin for abradants on a substrate containing an aqueous resol solution of claim 1.

* * * * *